July 7, 1959
J. R. WALKER
2,893,541
CABLE BELT CONVEYORS
Filed Sept. 9, 1957
3 Sheets-Sheet 1
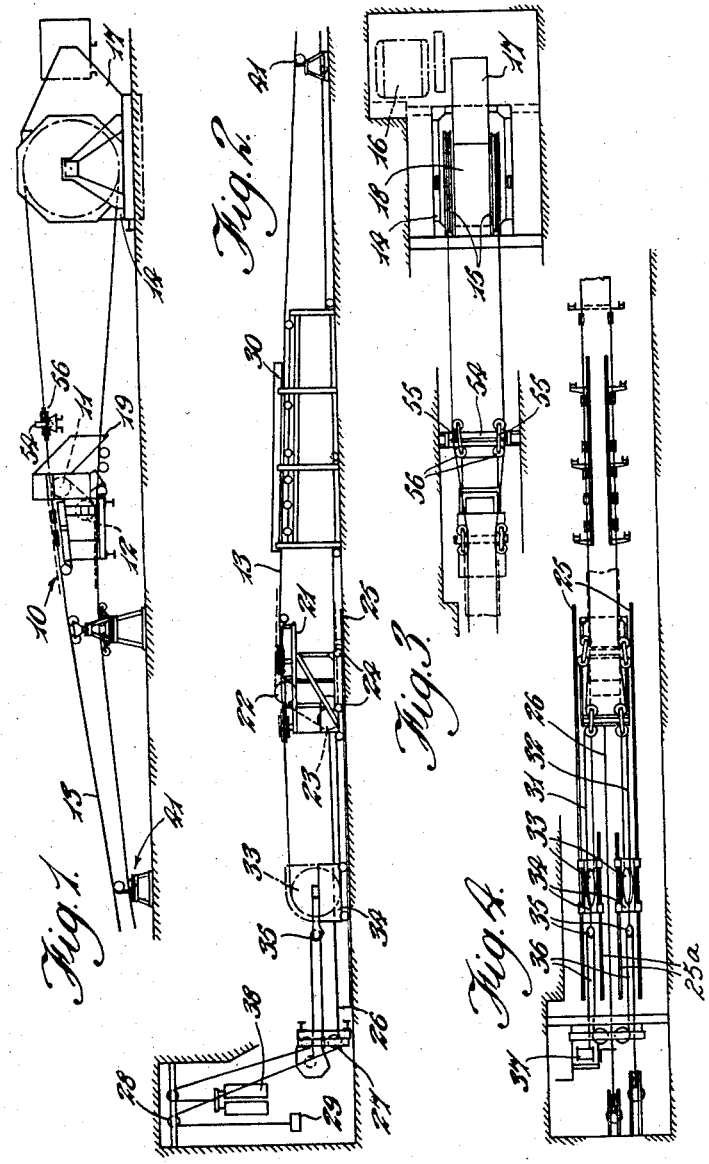

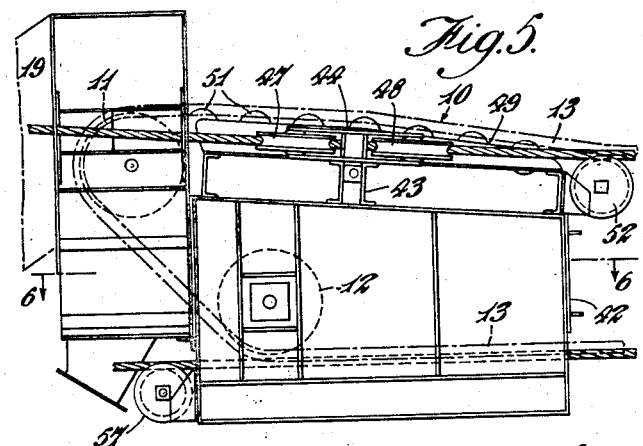
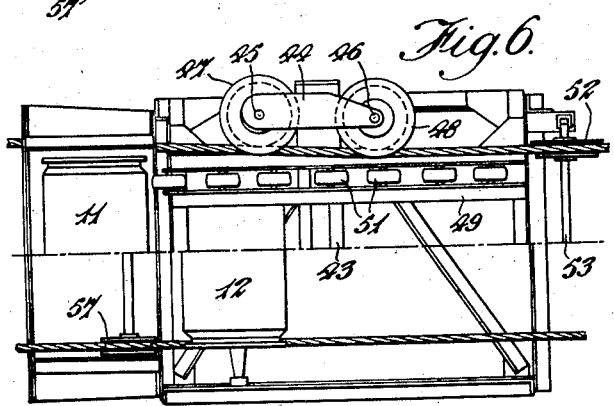
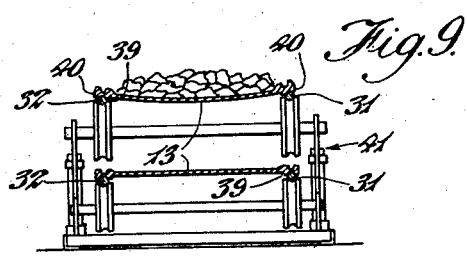

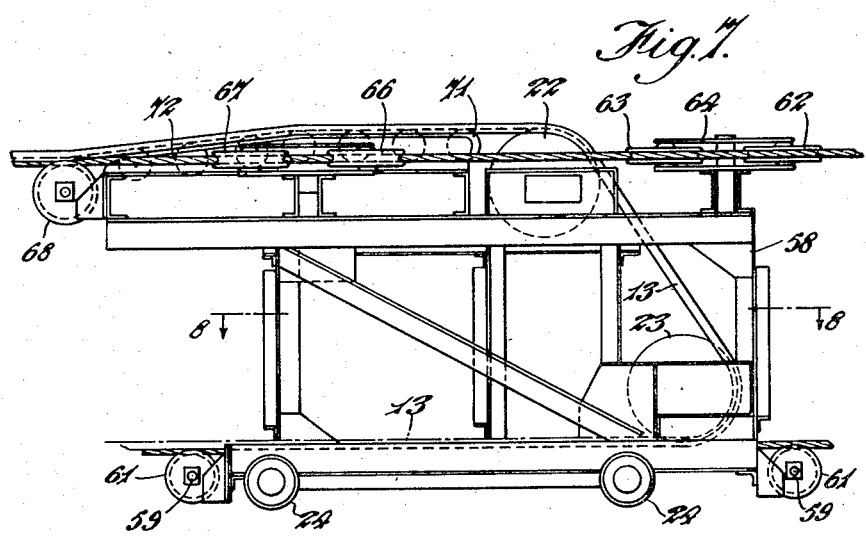
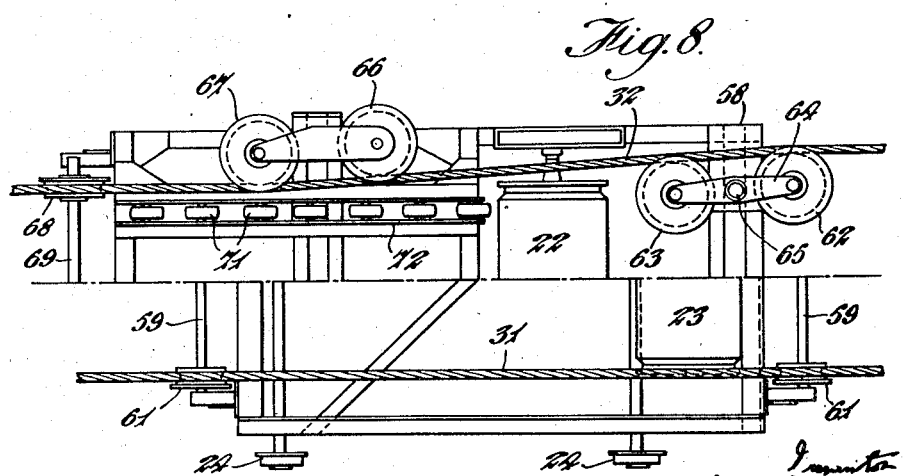

United States Patent Office 2,893,541
Patented July 7, 1959

2,893,541

CABLE BELT CONVEYORS

John R. Walker, Inverness, Scotland, assignor to Cable Belt Limited, Inverness, Scotland Application September 9, 1957, Serial No. 682,650

2 Claims. (Cl. 198—191)

This invention relates to cable belt conveyors, in which a belt forming the carrying element of the conveyor is supported adjacent its edges by a pair of cables each forming a cable circuit, the belt being supported on both its carrying and return runs by the cables, and the relative positions of the belt and cables being reversed at both ends of the conveyor so that the cables lie underneath the edges of the belt on both the carrying and return runs, the belt being provided with cable-engaging means which straddle the cables and are free to disengage the said cables when the belt is led away from them.

It has been found advantageous to employ, for driving the cable circuits, driving pulleys of the type known as surge wheels. The cables are wrapped more than once about these driving pulleys, and the said pulleys must therefore be located at positions where the cables are separated from the belt, to avoid pinching of the cable-engaging members on the belt between the turns of the cables, with consequent damage to the said members. The surge wheels employed are of large diameter, and in any practical arrangement, must be situated beyond the end drum over which the belt runs, so that incoming runs of the cables must be deflected outwardly beyond the overall width of the belt to pass the end loop therein, before being led on to the surge wheels.

According to the present invention, in a cable belt conveyor, the cable circuits are driven by a pair of coaxial surge wheels mounted in a position beyond the end drum over which the belt passes at the driving end of the conveyor, the portions of the incoming run of the belt adjacent the said end drum being supported by means other than the cables, and the incoming cable runs being deflected outwardly from their parallel belt supporting paths, after the belt has been separated therefrom, by means of guide pulleys mounted to turn about substantially vertical axes, and being again deflected by further similar guide pulleys to bring them into parallelism before they engage the surge wheels. Thus the incoming cables, which are subjected to high tension forces by the driving load, are positively guided in a lateral sense.

At the tail end of the conveyor, the cables pass over tension pulleys which may be mounted beyond the drum over which the belt passes at that end of the conveyor, the outgoing cable runs being deflected from parallel paths aligned with the tension pulleys to parallel belt-supporting paths by guide pulleys mounted to turn about substantially vertical axes and having an arrangement corresponding to that of the guide pulleys at the driving end.

The invention is hereinafter described with reference to the accompanying drawings, in which:

Figure 1 is a side elevation of the head end of a cable belt conveyor installation embodying the invention;

Figure 2 is a side elevation of the tail end of the conveyor installation shown in Figure 1;

Figure 3 is a plan view of the part of the conveyor installation shown in Figure 1;

Figure 4 is a plan view of the part of the conveyor installation shown in Figure 2;

Figure 5 is a side elevation, on a larger scale than Figures 1 to 4, of the head discharge unit shown in Figures 1 and 3;

Figure 6 is a plan view of the head discharge unit shown in Figure 5, the lower half of the figure being in section on the line 6—6 of Figure 5;

Figure 7 is a side elevation, on the same scale as Figure 5, of the belt tension carriage shown in Figures 2 and 4;

Figure 8 is a plan view of the belt tension carriage shown in Figure 7, the lower half of the figure being in section on the line 8—8 of Figure 7; and Figure 9 is a transverse section of the conveyor at a point intermediate its ends.

Referring to Figures 1 to 4, there is provided at the head end of the conveyor a head discharge unit 10 supporting upper and lower drums 11 and 12 over which the end loop of the belt 13 passes, and a frame 14 supporting a pair of surge wheels 15, 15 mounted co-axially and driven by an electric motor 16 through a reduction gear 17 and a differential gear 18, the latter being disposed between the two surge wheels 15, 15. The head discharge unit 10 includes a chute 19 which receives conveyed material discharged from the belt as it passes over the drum 11.

At the tail end of the conveyor there is provided a belt tension carriage 21 supporting upper and lower drums 22, 23 over which the end loop of the belt 13 passes, the carriage 21 being provided with wheels 24 running on rails 25, and being connected by a cable 26, passing over pulleys 27 and 28, to a suspended weight 29 acting to maintain tension on the belt. The cables 31 and 32 forming the two cable circuits which support and drive the belt 13 pass through the carriage 21 as will be hereinafter described, and are passed around belt tension pulleys 33, 33 each mounted on a wheeled carriage 34 running on one of the rails 25 and one of two intermediate rails 25a, the two carriages 34 each carrying a pulley 35 engaging in one of two bights of a cable 36 connected at one end to the drum of a hand winch 37 and at the other end to a suspended weight 38 which, through the cable 36, exerts a pull on the carriages 34 to tension the cables 31 and 32. At the head end of the conveyor, the cables 31 and 32 pass through the unit 10 and are wrapped at least twice around the surge wheels 15, 15. Adjacent the belt tension carriage 21, the belt 13 passes through a loading frame 30.

Between the head discharge unit 10 and the belt tension carriage 21, the cables 31 and 32, on both their upper and their lower runs, are so spaced transversely of the conveyor as to correspond with the lateral spacing between grooves defined by pairs of ribs 39, 40 on both sides of the belt and running along the faces of the belt 13 adjacent its edges, so that the cables lie in the said grooves and the belt is of the form described in United States Patent No. 2,751,065 to Thomson, being, as described therein supported on the cables. The belt is stiffened transversely by metal strips embedded therein and acting as resilient beams to allow the troughing of the belt under load which is shown in Figure 9, whilst transmitting the load substantially vertically downwardly to the cables. The cables are supported at intervals between the head and tail units by the pulleys of pulley sets 41.

Since the surge wheels 15, 15, and the tension pulleys 33, 33 are located beyond the end drums over which the belt passes, the upper runs of the cables, which are below the upper run of the belt, must be deflected outwardly to pass the edges of the belt. This deflection is achieved by the use of pulleys engaging the cables and mounted to turn about vertical axes.

Referring to Figures 5 and 6, the head discharge unit 10 comprises a frame 42, suitably supported, for example as shown in Figures 1 and 3, the drums 11 and 12, and the chute 19, being mounted thereon at its outer end. Intermediate its ends, the frame 42 carries a transverse beam 43 on each end of which is adjustably mounted a bracket 44 in which are mounted spindles 45, 46 for guide pulleys 47, 48, the spindles 45, 46 being substantially vertically disposed. Between the two brackets 44 there are mounted two pairs of rails, one of which is shown at 49 in Figure 6, the rails of each pair having mounted between them a series of rollers 51. The rails 49 slope upwardly from the inner end to the outer end of the head discharge unit 10, and lead the belt 13 on to the drum 11. A pair of guide pulleys 52, 52 are mounted on a horizontal shaft 53 at the inner end of the head discharge unit 10. Between the head discharge unit 10 and the frame 14 carrying the surge wheels 15 there is mounted, as shown in Figures 1 and 3, a beam 54 supporting a pair of brackets 55, 55, similar to the brackets 44 and each supporting two guide pulleys 56 rotatable about axes parallel to those of the pulleys 47, 48, all of the pulleys 56, 47 and 48 lying in a common plane which is inclined to the plane of the rails 49.

The upper runs of the cables 31 and 32 pass over the pulleys 52, 52 and run, without lateral deflection on to the inner sides of the pulleys 48. Bewteen the pulleys 52 and 48, the belt is lifted away from the cables by the rollers 51, so that the cables run out of the belt grooves. After passing over the pulleys 48, the cables are deflected laterally outwardly over the pulleys 47 to the outer sides of the pulleys 56, by which they are again deflected into parallelism, at a wider spacing and in alignment with the surge wheels 15. After passing two-and-one-half-times round the surge wheels, the cables are led back, with inward deflection, on to guide pulleys 57 mounted on horizontal axes at the outer end of the head discharge unit 10, from which they run parallel one with the other at the appropriate lateral spacing to engage the belt. The belt is led by the drum 12 downwardly into engagement with the outgoing cable runs, the cables entering the grooves in the outer face of the belt so that the latter is supported by the cables.

The belt tension carriage, which is shown in Figures 7 and 8, comprises a frame 58 supported on the wheels 24 and carrying, at each end, a transverse shaft 59 on which are mounted pairs of pulleys 61 to support the incoming lower runs of the cables 31 and 32. The said incoming lower cable runs pass, without lateral deflection, on to the lower sides of the tension pulleys 33, which are mounted on skewed spindles so that their upper sides are more widely spaced than their lower sides. After passing upwardly around the tension pulleys 33, the cables 31 and 32, which are now at the spacing of the upper sides of the tension pulleys 33, return towards the tension carriage 21, each cable passing over the laterally outer sides of a pair of guide pulleys 62, 63 mounted with their axes vertical on a rocking beam 64 itself mounted to move about a vertical pivot at 65 at the outer end of the carriage 21. Towards its inner end, the carriage 21 carries guide pulleys 66 and 67 for each cable, which pulleys are mounted in the same manner as the guide pulleys 47, 48 on the head discharge unit, these pulleys 66 and 67 being engaged by the cables on their laterally inner sides and serving to deflect the cables inwardly, after they have passed over the pulleys 62, 63, into their parallel belt-supporting paths. After leaving the pulleys 66, 67, the cables pass over pulleys 68 mounted on a horizontal spindle 69 on the carriage 21.

The lower drum 23, around which the belt 13 passes upwardly, leads the said belt away from the cables, the belt then passing over the upper drum 22, which is so positioned that it carries the belt between the outwardly deflected cables to a position above the said cables. After leaving the drum 22, the belt is supported by rollers 71 mounted between inclined rails 72 as on the head discharge unit, which lead it downwardly into engagement with the cables between the pulleys 67 and 68.

The conveyor arrangement according to the invention enables surge wheels to be used as driving pulleys for the conveyor without the necessity for having any major bends in the cables except where they pass round the surge wheels and tension pulleys. The arrangement is such that both the tension pulleys and the surge wheels can be of large diameter, thus minimizing the bending of the cables where they pass round them.

I claim:

1. A cable belt conveyor comprising an endless belt, end drums over which the said belt passes, a pair of cable circuits one on each side of the endless belt, a pair of coaxial surge wheels mounted beyond one end drum and each having the cable of one cable circuit wrapped round it, means for driving said surge wheels, a pair of tension pulleys beyond the other end drum and each having the cable of one cable circuit passing around it, means acting on the said tension pulleys to tension the cables, cable engaging means on the belt whereby the belt, between the end drums, is supported by the said cables, roller sets to support the upper run of the belt adjacent the end drums and to deflect said upper run of the belt upwardly away from the cables, and guide pulley means comprising pulleys mounted to turn about substantially vertical axes and co-operating with the upper runs of the cables to deflect them laterally; there being, for the upper run of each cable circuit, guide pulley means within the length of the roller set adjacent each end drum, and other guide pulley means beyond the said end drum, whereby the cables are deflected from positions of parallelism between the end drums to more widely spaced positions of parallelism beyond the end drums, said surge wheels and said tension pulleys being mounted with at least their upper parts spaced to correspond with the more widely spaced positions of the cables.

2. A cable belt conveyor according to claim 1, wherein each guide pulley means comprises a pair of pulleys and a beam supporting the said pulleys, the pulleys being mounted in tandem on the beam.

References Cited in the file of this patent

UNITED STATES PATENTS

| | | |
|---|---|---|
| 1,970,842 | Crossen | Aug. 21, 1934 |
| 2,489,440 | Vallance | Nov. 29, 1949 |
| 2,751,065 | Thomson | June 19, 1956 |